(12) United States Patent
Sathish et al.

US010642989B2

(10) Patent No.: US 10,642,989 B2
(45) Date of Patent: *May 5, 2020

(54) METHOD FOR MASKING CONTENT DISPLAYED ON ELECTRONIC DEVICE

(71) Applicant: Samsung Electronics Co., Ltd., Suwon-si, Gyeonggi-do (KR)

(72) Inventors: Sailesh Kumar Sathish, Bangalore (IN); Vinod Keshav Seetharamu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,184

(22) Filed: Mar. 6, 2019

(65) Prior Publication Data

US 2019/0205549 A1      Jul. 4, 2019

Related U.S. Application Data

(63) Continuation of application No. 15/235,678, filed on Aug. 12, 2016, now Pat. No. 10,242,204.

(30) Foreign Application Priority Data

Aug. 12, 2015  (IN) ........................ 4208/CHE/2015
Mar. 1, 2016   (IN) ........................ 4208/CHE/2015

(51) Int. Cl.
*G06F 21/60*     (2013.01)
*H04L 29/06*     (2006.01)
*H04W 12/08*     (2009.01)
*H04W 12/00*     (2009.01)

(52) U.S. Cl.
CPC ........ *G06F 21/604* (2013.01); *H04L 63/0245* (2013.01); *H04L 63/102* (2013.01); *H04W 12/0027* (2019.01); *H04W 12/08* (2013.01); *G06F 2221/032* (2013.01); *G06F 2221/2149* (2013.01)

(58) Field of Classification Search
CPC ...................................................... G06F 21/604
USPC ............................................................. 726/28
See application file for complete search history.

(56) References Cited

U.S. PATENT DOCUMENTS

| | | |
|---|---|---|
| 2002/0147782 A1 | 10/2002 | Dimitrova et al. |
| 2005/0060140 A1 | 3/2005 | Maddox |
| 2006/0004716 A1 | 1/2006 | Hurst-Hiller et al. |
| 2008/0228928 A1 | 9/2008 | Donelli et al. |
| 2009/0089828 A1 | 4/2009 | Carlsgaard et al. |
| 2010/0332977 A1* | 12/2010 | Nelson .............. G06Q 10/10 715/273 |
| 2014/0200893 A1 | 7/2014 | Vanjani |
| 2014/0359656 A1* | 12/2014 | Banica ............. H04N 21/812 725/32 |

* cited by examiner

*Primary Examiner* — Jacob Lipman
(74) *Attorney, Agent, or Firm* — Jefferson IP Law, LLP

(57) ABSTRACT

A method for masking content to be displayed on the electronic device is provided. The method includes receiving, by a processor in the electronic device, the content to be displayed on the electronic device, determining, by the processor, that at least one portion of the content is objectionable content based on a semantic signature of a content filter, and masking, by the processor, the at least one portion of the content displayed on the electronic device based on the detection.

20 Claims, 16 Drawing Sheets

FIG. 8

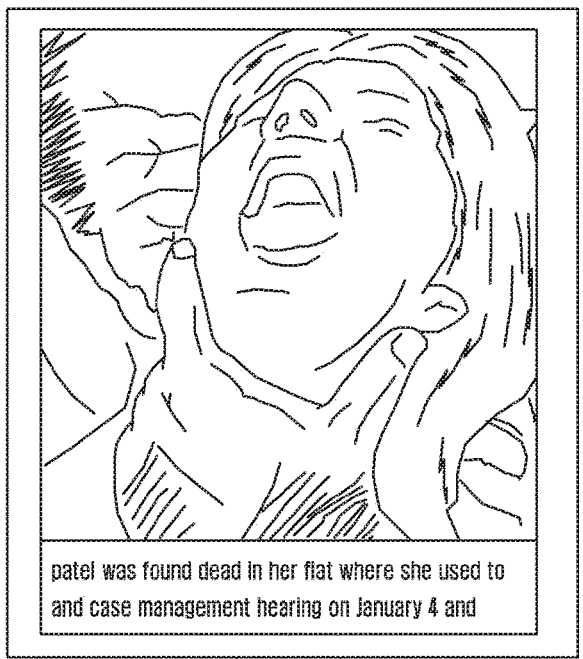

patel was found dead in her flat where she used to
and case management hearing on January 4 and

RELATED

Message: Cannot read this because it is not appropriate for 5 years old

LONDON: A man accused of strangling an Indian-origin woman to death in London was charged with murder and will stand trial in February, a media report said.

Miles Donnelly, 34, allegedly stabbed and strangled 44-year-old Usha patel at her home in Melrose Avenue, Cricklewood, on October 8, Evening Standard newspaper reported on Wednesday.

Donnelly made his first appearance on Wednesday at the Old Bailey Court, London via video link from Wormwood Scrubs Prison and confirmed his identity He has been remanded in custody until a plea and case management hearing on January 4 and a two-week trial has been fixed for February 17.

Patel was found dead in her flat where she used to live with her five-year-old autistic son.

- Stabbed (Masked version)
- Stabbed (Shrinked version)
- Harmed (alternate word)

FIG. 9

With barely 24 hours to go before Company-A begins the sale of latest phone devices, market leader Company-B has said that it does not expect a pressure on the sales of its premium products such as the edge phone and note devices. Industry players and key distributors, however, believe that the "pressure will be immense" on the company-B "The market is large and there is enough room for everybody. Spokesperson at the Company-B is confident of growing sales in the premium category".

Example for positive highlight for a particular Section. Here "Positive Highlight" content filter is applied

METHOD FOR MASKING CONTENT DISPLAYED ON ELECTRONIC DEVICE

CROSS-REFERENCE TO RELATED APPLICATION(S)

This application is a continuation application of prior application Ser. No. 15/235,678, filed on Aug. 12, 2016, which was based on and claimed priority under 35 U.S.C. § 119(a) of a Indian provisional patent application number 4208/CHE/2015, filed on Aug. 12, 2015, and under 35 U.S.C. § 119(a) of an Indian patent application number 4208/CHE/2015, filed on Mar. 1, 2016 in the Indian Intellectual Property Office, the disclosure of which is incorporated by reference herein in its entirety.

TECHNICAL FIELD

The present disclosure relates to electronic devices. More particularly, the present disclosure relates to a mechanism for masking content displayed on the electronic device.

BACKGROUND

The Internet is a valuable resource that provides access to a wide variety of information. Some of the information available on the Internet, however, is not appropriate for all users. For example, while many web sites have content that may be educational or entertaining for children, there are a number of web sites that contain content that is not appropriate for children, such as adult content or violent content. A number of internet filtering products are available, such as Net Nanny™ and Cyber Patrol™ configured by a parent or an adult to prevent children from accessing the web sites having inappropriate content or to only allow access to designated sites having appropriate content.

In the systems and methods of the related art, a plethora of mechanism(s) are available which block the content at the web site level i.e., a particular web site may be deemed objectionable or non-objectionable. The current mechanisms are based on full domains where articles or sections within the articles cannot be censored or blocked. This means either the whole site is inaccessible or an accessible site may contain objectionable articles or sections within the article that is objectionable. Moreover, users do not have control over what they deem offensive and cannot block future sites based on personal objectionable content or those that may be objectionable to a group of people such as family associated with the user. A need therefore exists for an improved method and system for preventing access to the objectionable content. A further need exists for a method and system for preventing access to the objectionable content based on an analysis of the information associated with the content.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mechanism for masking content displayed on an electronic device.

Another aspect of the present disclosure is to provide a mechanism for receiving, by a processor in the electronic device, the content to be displayed on the electronic device.

Another aspect of the present disclosure is to provide a mechanism for detecting, by the controller unit, at least one portion of the content is an objectionable content based on a semantic signature of a content filter.

Another aspect of the present disclosure is to provide a mechanism for masking, by the controller unit, the at least one portion of the content displayed on the electronic device based on the detection.

In accordance with an aspect of the present disclosure, a method for masking content displayed on an electronic device is provided. The method includes receiving, by a processor in the electronic device, content to be displayed on the electronic device, determining, by the processor, that at least one portion of the content is objectionable content based on a semantic signature of a content filter, and masking, by the processor, the at least one portion of the content displayed on the electronic device based on the determination.

In accordance with another aspect of the present disclosure, an electronic device for masking content is provided. The electronic device includes a processor configured to receive the content to be displayed on the electronic device, determine that at least one portion of the content is objectionable content based on a semantic signature of a content filter, and mask the at least one portion of the content displayed on the electronic device based on the determination.

In accordance with another aspect of the present disclosure, a system for masking content is provided. The system includes a first electronic device configured to send a content filter to a second electronic device, and a second electronic device configured to receive the content filter from the first electronic device, receive the content to be displayed, determine that at least one portion of the content is objectionable content based on a semantic signature of the content filter, and mask the at least portion of the content displayed based on the determination.

In accordance with another aspect of the present disclosure, a computer program product including a computer executable program code recorded on a computer readable non-transitory storage medium is provided. The computer executable program code, when executed, performs a method including receiving, by a processor in an electronic device, content to be displayed on the electronic device, determining, by the processor, that at least one portion of the content is objectionable content based on a semantic signature of a content filter, and masking, by the controller unit, the at least one portion of the content displayed on the electronic device based on the determination.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 illustrates another example for indicating an extent of masking to a user according to an embodiment of the present disclosure;

FIG. 9 illustrates an example for providing positive read experience according to an embodiment of the present disclosure;

Throughout the drawings, like reference numerals will be understood to refer to like parts, components, and structures.

DETAILED DESCRIPTION

Figure 1:
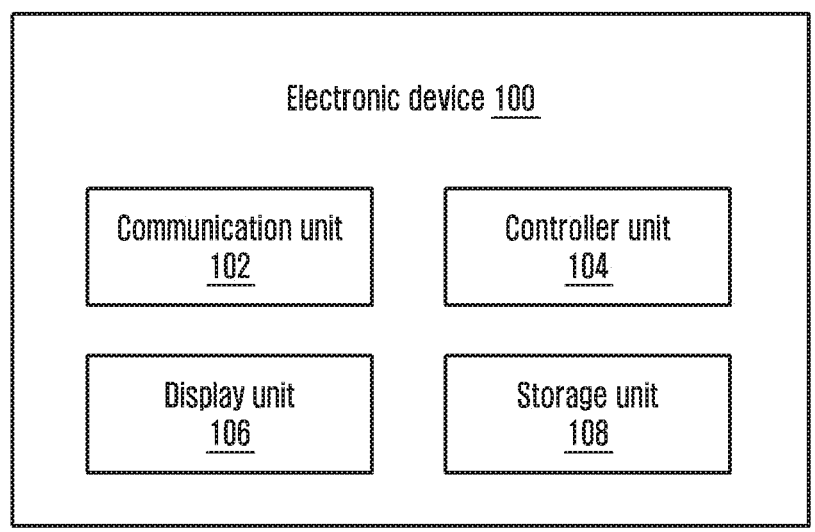
FIG. 1 illustrates various units of an electronic device for masking content according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification herein, "content" may be any type of electronic media that is viewable via a communication device like a computer, laptop, personal digital assistant (PDA), Blackberry™, cell phone, or the like.

The embodiments herein disclose a method for masking content displayed on an electronic device. The method includes receiving the content to be displayed on the electronic device. Further, the method includes determining at least one portion of the content is an objectionable content based on a semantic signature of a content filter. Further, the method includes masking the at least one portion of the content displayed on the electronic device based on the determining.

In an embodiment, determining the at least one portion of the content is the objectionable content includes computing a semantic signature of the at least one portion of the content to be displayed on the electronic device. Further, the method includes determining a degree of similarity between the semantic signature of the at least one portion of the content and a semantic signature of the content filter. Further, the method includes determining the at least one portion of the content as the objectionable content based on the degree of similarity.

In an embodiment, the portion of the content is at least one of a text, an image, a video, a uniform resource locator (URL), a uniform resource identifier (URI), and content behind the URL.

In an embodiment, the content behind the URL is determined by searching a semantic content behind the URL by a web crawler.

In an embodiment, masking the at least one portion of the content includes at least one of blocking the objectionable content completely, blocking the objectionable content partially, blocking the objectionable content transparently, changing font style of the objectionable content, and highlighting the objectionable content.

In an embodiment, the content filter is one of generated within the electronic device and received from another electronic device.

Unlike the systems and methods of the related art, the proposed mechanism allows for building content masks for the users, creation and application of the theme filters, where a cross-language application can be specified within such filters such that the filters for one language can be applicable for the content in other languages as well.

Referring now to the drawings, and more particularly to FIGS. 1 through 12, where similar reference characters denote corresponding features consistently throughout the figures, there are shown preferred embodiments.

FIG. 1 illustrates various units of an electronic device for masking content according to an embodiment of the present disclosure.

Referring to FIG. 1, the electronic device 100 can be, for example and not limited to a laptop, a desktop computer, a mobile phone, a smart phone, PDAs, a tablet, a phablet, a consumer electronic device, or any other electronic device. In an embodiment, the electronic device 100 includes a controller unit 104, a display unit 106, a storage unit 108, and a communication unit 102.

The controller unit 104 can be configured to receive the content to be displayed on the display unit 106 of the electronic device 100. The content may be, for example, emails, documents, e-books, browsing history, web page(s), or the like. Further, the controller unit 104 can be configured to compute a semantic signature of at least one portion of the content to be displayed on the display unit 106. Further, the controller unit 104 can be configured to determine a degree of similarity between the semantic signature of the at least one portion of the content and a semantic signature of a content filter. The content filter may be generated within the electronic device 100 received from another electronic device.

Further, the controller unit 104 can be configured to detect the at least one portion of the content as the objectionable content based on the degree of similarity. Further, the controller unit 104 can be configured to mask the at least one portion of the content displayed on the display unit 106 based on the detection. In an embodiment, masking of the at least one portion of the content includes blocking the objectionable content completely, blocking the objectionable content partially, blocking the objectionable content transparently, changing font style of the objectionable content, or highlighting the objectionable content.

The portion of the content may be a text, an image, a video, a URL, a URI, the content behind the URL, or combination of same. Further, the content behind the URL is determined by searching a semantic content behind the URL by a web crawler (or a micro-crawler).

Further, the display unit 106 can be configured to display the masked content to the user of the electronic device 100. The storage unit 108 can be configured to store the content filter, which is later used by the controller unit 104 for detecting the at least one portion of the content is the objectionable content based on the semantic signature of the content filter.

Further, the storage unit 108 may include one or more computer-readable storage media. The storage unit 108 may include non-volatile storage elements. Examples of such non-volatile storage elements may include magnetic hard disks, optical discs, floppy disks, flash memories, or forms of electrically programmable read only memories (EPROMs) or electrically erasable and programmable ROMs (EEPROMs). In addition, the storage unit 106 may, in some examples, be considered a non-transitory storage medium. The term "non-transitory" may indicate that the storage medium is not embodied in a carrier wave or a propagated signal. However, the term "non-transitory" should not be interpreted that the storage unit 106 is non-movable. In some examples, the storage unit 106 can be configured to store larger amounts of information than the memory. In certain examples, a non-transitory storage medium may store data that can, over time, change (e.g., in random access memory (RAM) or cache). The communication unit 102 can be configured to receive the content filter from another device (i.e., third party entity). Further, the communication unit 102 can be configured for communicating internally between the units and externally with the networks.

Unlike the systems and methods of the related art, the proposed mechanism is used for masking the objectionable content within the web content or other associated content. The proposed mechanism allows section wise, word level, word combination, phrases, images, or video level masking as marked and desired by the user. Further, the proposed mechanism allows the user to apply same masking for set of users associated with the user. Further, the proposed mechanism allows masking specific links within a loaded web page domain to be masked on heuristics and settings.

In an example, the proposed mechanism masks (or removes) the objectionable content within the web page as desired by the user. Full sections, words, phrases, or word combinations are masked based on semantics (i.e., meaning) of the section. Further, the proposed mechanisms can be applied by a user to his/her family members (or associated groups). The user can also revoke (or remove) if requested by associated users.

In another example, the built-in micro-crawler within a browser is used for domain cleaning. On page load, the micro-crawler may crawl all visible links and mask links based on the degree of the objectionable content determined. Based on a threshold which indicates the amount of objectionable content, the links within the content are masked.

In another example, the content filter themes such as religion specific, country specific, event specific, artifact specific, or the like can be applied or invoked. The content filter themes can be developed by a third party or can be developed by the user(s).

FIG. 1 shows a limited overview of the electronic device 100 but, it is to be understood that other embodiments are not limited thereto. Further, the electronic device 100 can include any number of units communicating among each other.

Figure 2:
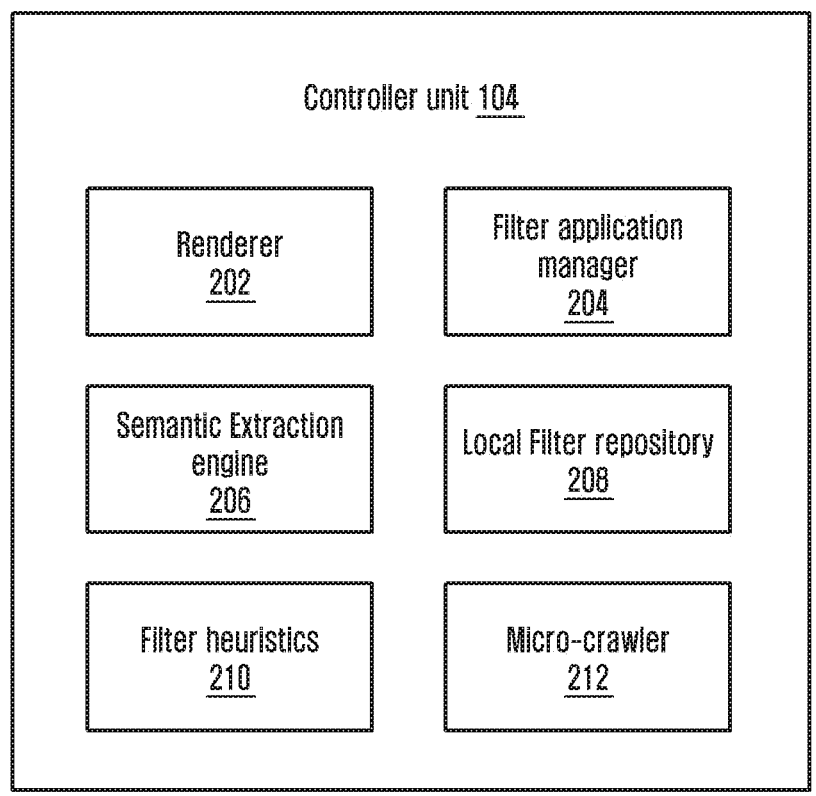
FIG. 2 illustrates various units of a controller unit for masking the content according to an embodiment of the present disclosure.

FIG. 2 illustrates various units of the controller unit for masking the content according to an embodiment of the present disclosure.

Referring to FIG. 2, the controller unit 104 includes a rendering engine 202, a filter application manager 204, a semantic extraction engine 206, a local filter repository 208, filter heuristics 210, and a micro-crawler 212.

The rendering engine 202 handles the rendering of the web pages along with the applied content filter(s). The content filter can be generated within the electronic device 100. Alternatively, the content filter can be received from another electronic device (i.e., not shown). Different applications may implement the rendering functionality differently and within its own application context. The filter application manager 204 manages all user experience (UX) related functions with respect to application and management of the content filter. In an example, the filter application manager 204 receives the text input from application along with the content filter (i.e., the content filter to which that input was directed). Further, the filter application manager 204 calls the semantic extraction engine 206 to process the current text along with the full text of the current page. The semantic extraction engine 206 passes the processed semantic signature to the filter application manager 204 which is then stored locally by the filter application manager 204 within the local repository 208.

The filter application manager 204 may receive and process the input on behalf of the user, acting on the data provided along with the received input commands, invoking necessary components for processing the input, storing the processed output, invoking masking function over text, fetching semantic signatures from the local repository 208 for the semantic extraction engine 206, invoking the rendering engine 202, and for managing user accounts where applicable.

Further, the semantic extraction engine 206 is responsible for generating the semantic signature that captures the semantics contained within the received content (i.e., a block of text or sentence). In an embodiment, the semantic extraction engine 206 employs the latent Dirichlet allocation (LDA) algorithm for capturing a latent signature pattern applicable within the content (i.e., the block of text). Other mechanisms for capturing the latent signature pattern applicable within the content are also possible such as probabilistic latent semantic analysis (PLSA) or explicit semantic analysis (ESA).

The semantic extraction engine 206 extracts the signature for the at least one portion of the content to be displayed and performs match analysis for the at least one portion of the content against the existing semantic signature. The semantic extraction process considers the whole text to account to figure out a list of latent topics available within the complete content, the latent signature (i.e., probabilistic word vector) for the specific content and category information which is provided based on a supervised model that may be pre-existing on the electronic device 100 and preloaded by the original equipment manufacturer (OEM). Further, the semantic extraction engine 206 works through the filter application manager 204 to obtain and provide the content (i.e., text blocks) and signatures as applicable. The match process happens when the semantic extraction engine 206 is invoked by the filter application manager 204 to perform checks for the content against currently available signatures. Further, the semantic extraction engine 206 responds with the corresponding areas (i.e., portion of the content) with the content for masking or highlighting.

The local filter repository 208 is a database that is locally resident in the electronic device 100. The local filter repository 208 can employ structured query language (SQL) or No-SQL database. Further, the local filter repository 208 can be used for storing user account specific data and the semantic signatures associated with the data. In addition, the database may also index the semantic signatures against all the users that the signature is associated to. This may include a private network such as a family network. The local filter repository 208 can also synchronize with remote repositories stored either on other electronic device or within a server side database. The local filter repository 208 will be used by calling components for storing and retrieving the content or the semantic signatures associated with the content. In an example, the local filter repository 208 may be used by the calling components for storing and retrieving text blocks or semantic signatures associated with the text blocks. The local filter repository 208 may store any masking, rendering, UX specific rules that may be called by any associated component.

The filter heuristics 210 provides details on how the masking or highlighting of the at least one portion of the content needs to be performed. In an example, the at least one portion of the content is masked by changing the font style. In another example, the at least one portion of the content is completely masked. In another example, the at least one portion of the content is partially masked. In another example, the at least one portion of the content is masked with a different color. In another example, the at least one portion of the content is highlighted with a color.

The micro-crawler 212 (or crawler) is a browser specific component that resides within the client browser. Once a page is loaded, the micro-crawler 212 crawls through each link, fetches the content behind the links, and passes the fetched content to the filter application manager 204. The filter application manager 204 then transfers to the semantic extraction engine 206 to determine whether the link needs to be masked.

In an example, if any objectionable content is detected within the content such as text block, images, words, or the like of the web page, the user can invoke the content filter and add that section or words to the content filter. Unlike the systems and methods of the related art, the proposed mechanism computes the semantic signature of the content using the math models (i.e., unstructured semantic representation) that are language and content independent. If the same type of the content appears in any of the web page(s), it gets masked. The masking can also be applied to the client browser history and masking is performed at semantic level but not for whole content. The proposed mechanism removes or masks the objectionable content within the web pages as desired by the user. In an example, the full section, the words, the phrases, or the word combinations can be removed or masked.

In another example, consider a scenario where the user loads the web page. Once the web page is loaded, the micro-crawler 212 crawls all visible links and masks the links based on an amount of objectionable content present behind each link. The micro-crawler 212 within the client browser can be used for domain cleaning. The micro-crawler 212, when part of the client browser, crawls the links within the web content and masks the links based on the objectionable content, present behind each link. The micro-crawler 212, specially devised to understand and search for the at least one portion of the content behind the links based on the content semantic signature. The semantic signature derived from the content provided by the user as the objectionable content and the links to the objectionable content are discovered by the micro-crawler 212. Further, the links to the objectionable content are extracted by the micro-crawler 212 and the detected links with the objectionable content above the threshold are masked or highlighted for the user.

In another example, the user of the electronic device 100 can apply the content filter to his/her family members or to associated groups. The content filter can be applied specifically to particular members of the family or the associated group for masking the portion of the content which is objectionable. In order to unmask the at least one portion of the content, the member can request the user by sending a unmask request by performing a long press gesture or an indicator thereof. After receiving the request, the user may unmask with a key (i.e., password or fingerprint) and the requested content is unmasked at the requesting member end.

FIG. 2 shows a limited overview of the controller unit 104, but it is to be understood that other embodiments are not limited thereto. Further, the controller unit 104 can include any number of units communicating among each other.

Figure 3A:
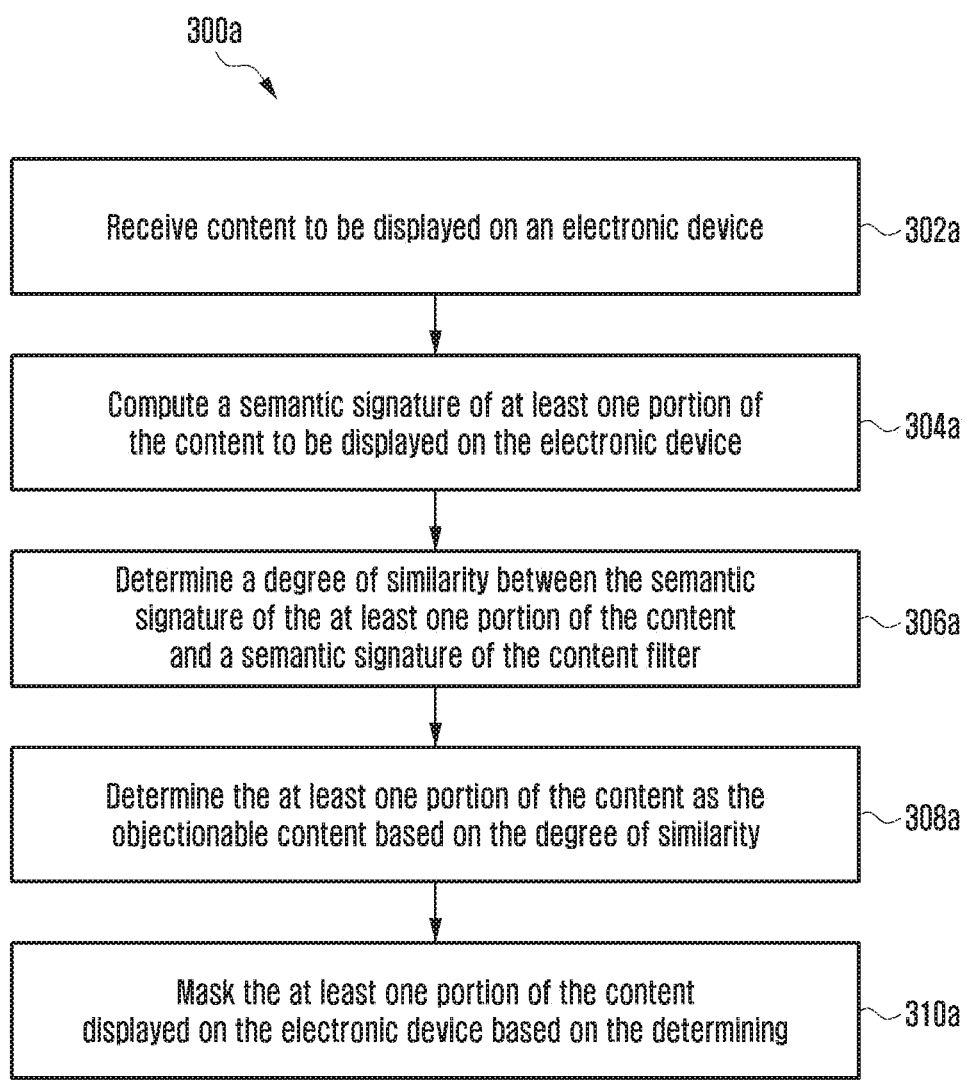
FIG. 3A is a flow diagram illustrating a method for masking the content displayed on the electronic device according to an embodiment of the present disclosure.
Figure 3B:
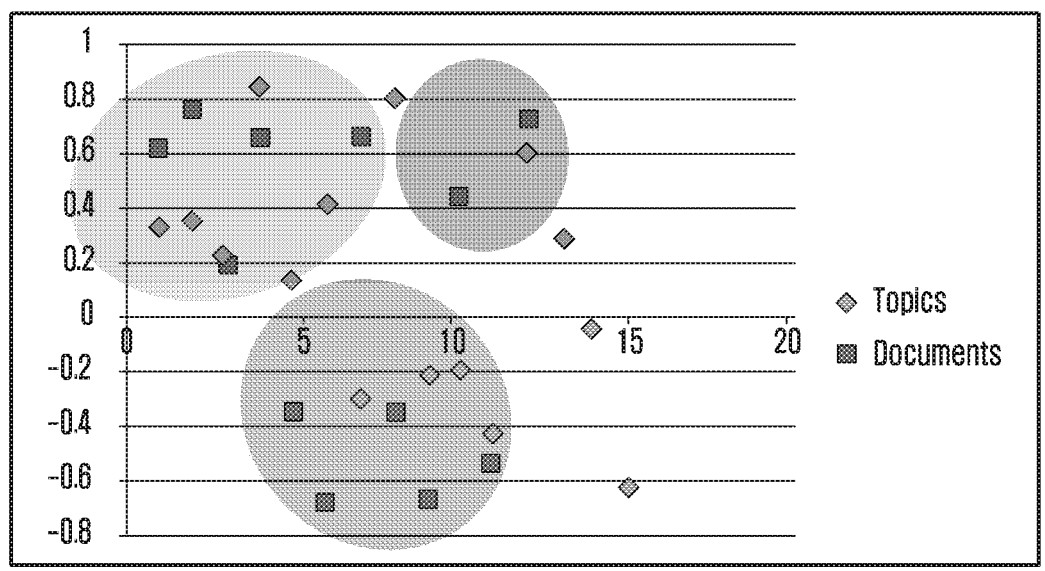
FIG. 3B illustrates a graph showing topics and documents according to an embodiment of the present disclosure.

FIG. 3A is a flow diagram illustrating a method 300a for masking the content displayed on the electronic device 100 according to an embodiment of the present disclosure. FIG. 3B illustrates a graph showing topics and documents according to an embodiment of the present disclosure.

Referring to FIGS. 3A and 3B, at operation 302a, the content to be displayed on the electronic device 100 is received. The method 300a allows the controller unit 104 to receive the content to be displayed on the electronic device 100.

At operation 304a, the semantic signature of the at least one portion of the content to be displayed on the electronic device 100 is computed. The method 300a allows the controller unit 104 to compute the semantic signature of the at least one portion of the content to be displayed on the electronic device 100. The at least one portion of the content is may be text, images, video, a URL, a URI, and content behind the URL. The content behind the URL may be determined by searching the semantic content behind the URL by the micro-crawler 212 (i.e., the crawler). In an example, custom topic extraction based on latent spread using a word signature (i.e., probability distribution). It is a hybrid heuristics based system. In case of sections, supervised topic distribution matrix with singular value computation (decomposition) and index check is performed. The below Table-1 shows the probability distribution of topics ($T_1$, $T_2$, $T_3$, $T_4$, and $T_5$) with documents ($D_1$, $D_2$, $D_3$, $D_4$, $D_5$, and $D_6$).

TABLE 1

|       | $D_1$ | $D_2$ | $D_3$ | $D_4$ | $D_5$ | $D_6$ |
|-------|-------|-------|-------|-------|-------|-------|
| $T_1$ | 0.22  | 0.02  | 0.015 | 0.542 | 0.015 | 0.218 |
| $T_2$ | 0.136 | 0.14  | 0.232 | 0.231 | 0.448 | 0.107 |
| $T_3$ | 0.26  | 0.02  | 0.012 | 0.116 | 0.164 | 0.46  |
| $T_4$ | 0.372 | 0.46  | 0.32  | 0.111 | 0.105 | 0.105 |
| $T_5$ | 0.012 | 0.158 | 0     | 0     | 0.268 | 0.11  |

The supervised topic distribution matrix with singular value computation (decomposition) and index check is shown below:

Topic Distribution Matrix $$U\Sigma \quad\quad V$$

$$\begin{bmatrix} 0.347 & -0.307 & 0.588 \\ 0.222 & 0.807 & 0.279 \\ 0.838 & -0.215 & -0.043 \\ 0.138 & -0.200 & -0.621 \end{bmatrix} \begin{bmatrix} 0.801 & 0 & 0 \\ 0 & 0.23 & 0 \\ 0 & 0 & 0.167 \end{bmatrix} \begin{bmatrix} 0.613 & 0.653 & 0.445 \\ 0.765 & -0.349 & -0.542 \\ 0.198 & -0.672 & 0.713 \end{bmatrix}$$

In case of terms and phrases, N-Gram processing is performed. The example graph of N-Gram processing is shown in FIG. 3B.

At operation 306a, the degree of similarity between the semantic signature of the at least one portion of the content and the semantic signature of the content filter is determined. The method 300a allows the controller unit 104 to determine the degree of similarity between the semantic signature of the at least one portion of the content and the semantic signature of the content filter. The content filter may be generated within the electronic device 100. The content filter may be received from another electronic device. At operation 308a, the at least one portion of the content as the objectionable content based on the degree of similarity is detected (or determined). The method 300a allows the controller unit 104 to detect the at least one portion of the content as the objectionable content based on the degree of similarity. At operation 310a, the method 300a the at least one portion of the content displayed on the electronic device 100 is masked based on the detection. The method 300a allows the controller unit 104 to mask the at least one portion of the content displayed on the electronic device 100 based on the detection.

Masking the at least one portion of the content may include blocking the objectionable content completely, blocking the objectionable content partially, blocking the objectionable content transparently, changing font style of the objectionable content, highlighting the objectionable content, or combination of same. In an example, if the degree of similarity is more than X % (i.e., greater extent) then the objectionable content is blocked completely. In another example, if the degree of similarity is less than X % and more than Y % then the objectionable content is blocked partially. In another example, if the degree of similarity is less Y % then the objectionable content is blocked transparently or highlighted.

In order to mask the objectionable content within the web page, the user may drag and drop the content within the content filter. A proprietary modified client content extraction process may be applied after the page load but before rendering the content. In another example, the content filter may be applied to all the content within the web page by matching semantically with the sections, the words, the word combinations, the phrases, the images, the videos, or the like. Unlike the systems and methods of the related art, the proposed mechanism uses multiple hybrid combinations of technology that can be applied thus, allowing the objectionable content (i.e., portion of the content which is objectionable) to be masked at different granularity level.

In order to mask the links within the web page, the micro-crawler 212 may crawl the domain that the user has loaded. The micro-crawler 212 processes the content behind the links available inside the loaded web page. Further, the micro-crawler 212 detects the threshold levels for the objectionable content and either masks the content (i.e., at least one portion of the content) or entire link. The micro-crawler 212 is modified component that uses the semantic signatures for masking the objectionable content.

The content filter may be applied to other users for masking the objectionable content. Based on a sync platform backed by a specific UX, other users will also obtain the content masks. The other users can seek to unblock the content after requesting permission from the user who can unblock remotely. Further, unblocking the content is applied only to applicable sections within the web page.

External filters provisioned by the third party or created by the users may be applied to self, groups, browser history, or the like. The external filters may be generally related to a theme. External themes can be uploaded by specific organizations, individuals, or the like. This can be discovered via a specific user interface (UI) on browser or tab. Also downloadable from a service page and users can create these either directly from the browser or using a tool.

The various actions, acts, blocks, operations, or the like in the method 300a may be performed in the order presented, in a different order or simultaneously. Further, in some embodiments, some of the actions, acts, blocks, operations, or the like may be omitted, added, modified, skipped, or the like without departing from the scope of the present disclosure.

Figure 4:
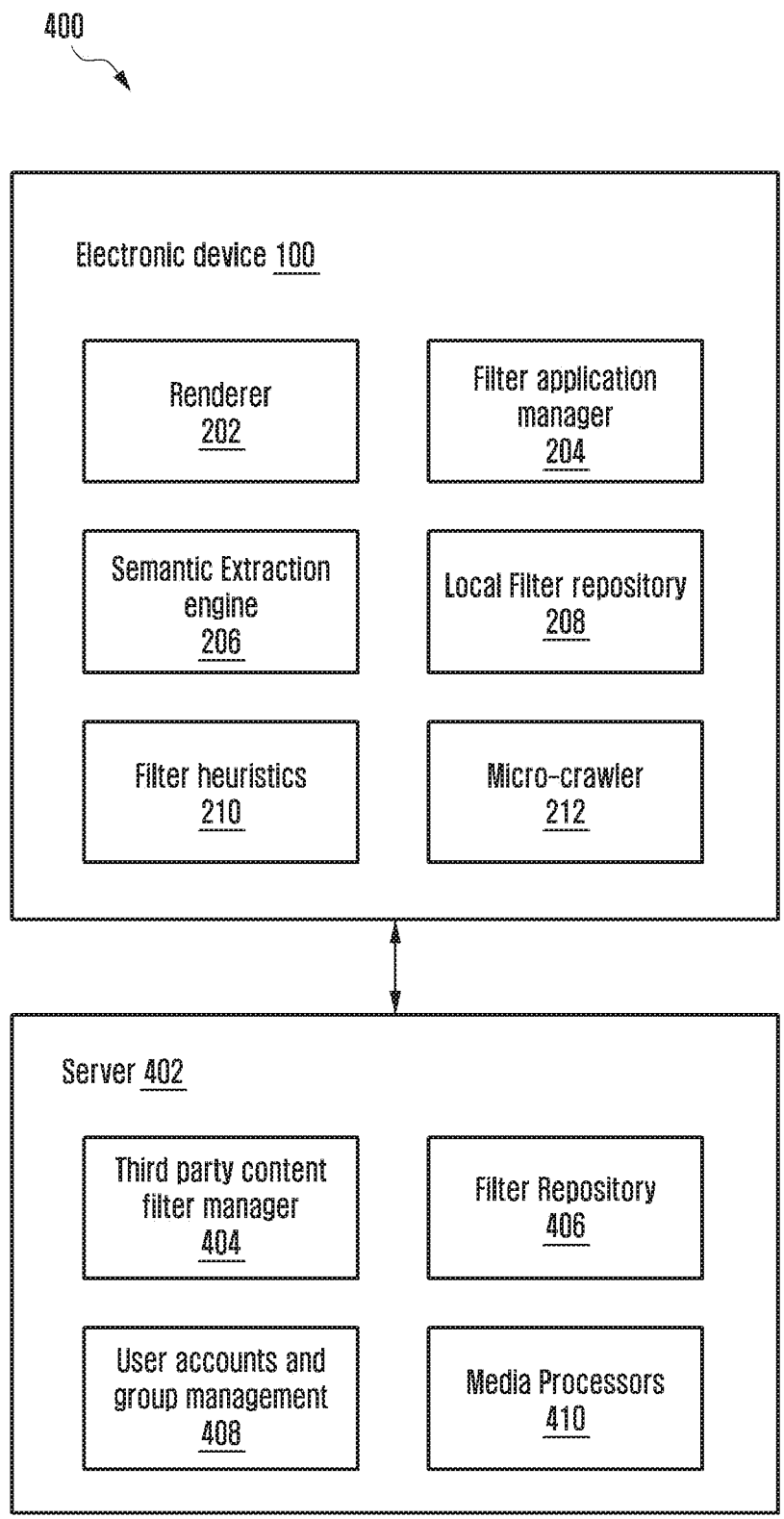
FIG. 4 illustrates a client-server architecture for masking content according to an embodiment of the present disclosure.

FIG. 4 illustrates a client-server architecture for masking the content according to an embodiment of the present disclosure.

Referring to FIG. 4, the client-server architecture 400 includes the electronic device 100 and a server 402.

The electronic device 100 includes the renderer 202, the filter application manager 204, the semantic extraction engine 206, the local filter repository 208, the filter heuristics 210, and the micro-crawler 212. The components inside the electronic device 100 may be implemented as part of an independent service (or can be integrated within an application like a browser). If implemented as part of a service, the application may also need to implement certain features of the filter application manager 204 such as the UI and UX components, and the renderer 202 component that handles the rendering of the pages along with the applied filters. Different applications may implement the rendering functionality differently and within its own application context. The functionalities of the electronic device 100 are explained in conjunction with FIGS. 1 and 2.

The server 402 includes a third party content filter manager 404, a filter repository 406, user accounts and group management 408, and media processors 410. In an embodiment, the server 402 deals with an external content that are indexed semantically in order to match against a particular text signature, full text content, or just the URL that the electronic device 100 may send to the server 402 to mask the objectionable content.

The third party content filter manager 404 and the filter repository 406 works together in conjunction achieving the functionality of crawling, fetching, and indexing. The indexing is performed in a way similar to how the semantic extraction engine 206 works in the controller unit 104. The sections of the content or entire web page are analyzed for semantic signatures using LDA or similar latent extraction methods. The fetched and indexed content is then stored in the filter repository 406. Based on the stored content, the third party content filter manager 404 performs the functions of the filter application manager 204 and the semantic extraction engine 206. Further, the server 402 sends the masked content to the electronic device 100.

It may be desired that (e.g., due to business reasons), only certain authorized applications and users may have the functionality to access the masking functionality. The authentication and white list management is handled by the user accounts and group management unit 408. The media processor unit 410 is an optional component that may be used in cases where the masking can be extended to cases beyond text. This is particularly applicable where other media such as video, images, or the like are concerned.

The functionalities may be split between the electronic device 100 and the server 402 depending on the features supported. It is to be noted that the server 402 is not required for providing the masking functionality. Further, the server 402 is only used in scenario where the masking needs to be performed on the server end based on the user and application authentication. In an embodiment, the functionalities performed by the electronic device 100 and the server 402 can be performed by the electronic device 100 alone.

Figure 5A:
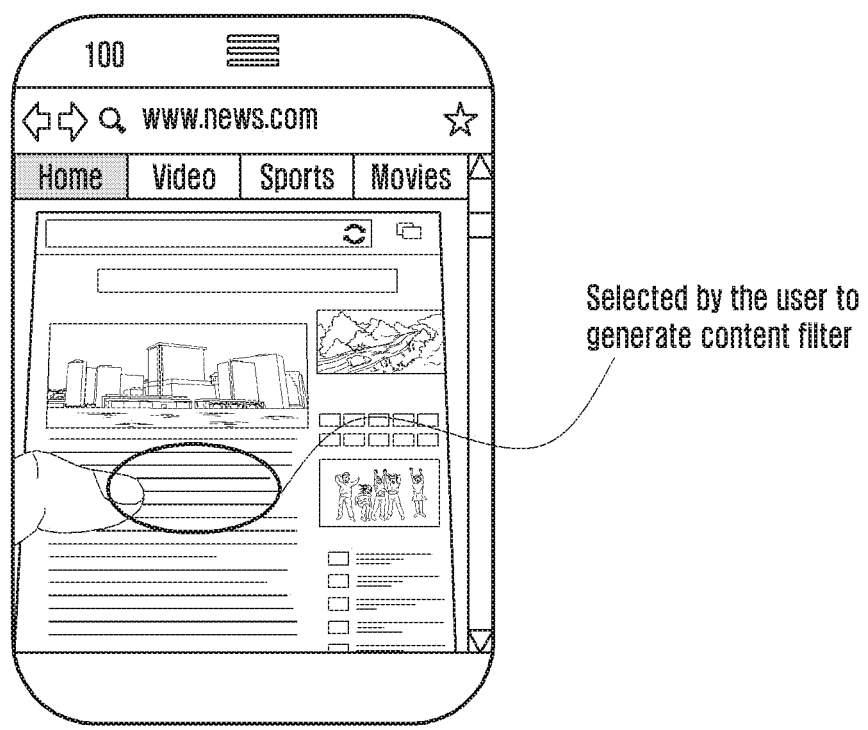
FIGS. 5A to 5C illustrate an example for masking content displayed on an electronic device according to an embodiment of the present disclosure.
Figure 5B:
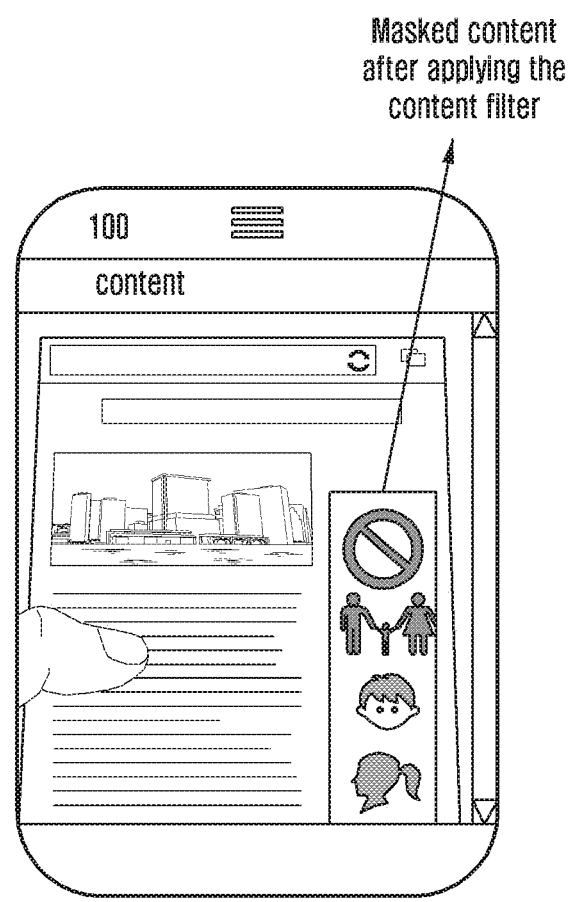
Figure 5C:
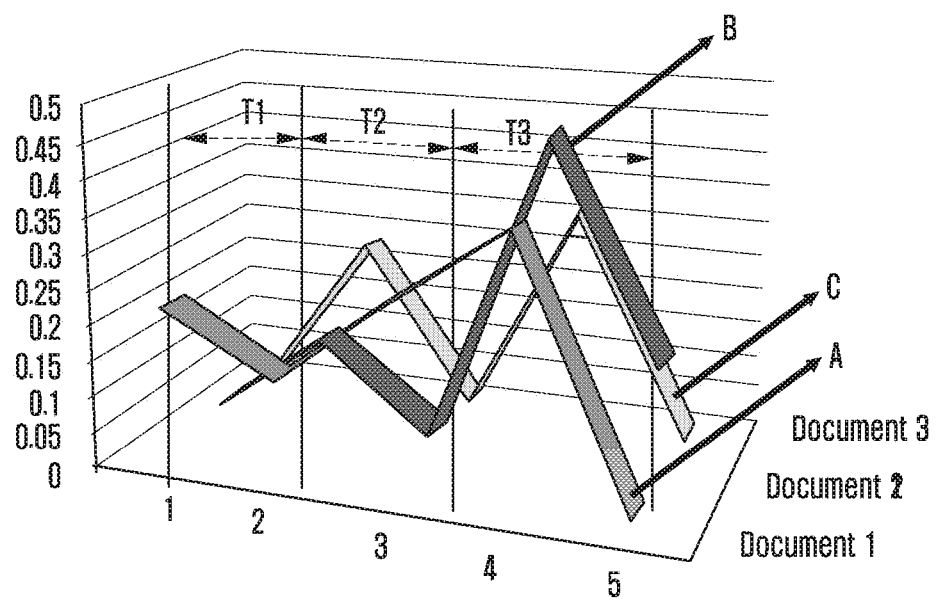

FIGS. 5A to 5C illustrate an example for masking the content displayed on the electronic device 100 according to an embodiment of the present disclosure.

Referring to FIGS. 5A, 5B, and 5C, consider a scenario where the user loads the content such as the web page to be displayed on the electronic device 100. Initially, the user selects the content (i.e., content filter) directive indicating the section of the content, words or word combinations, the one or more images, an image type, a video/video type, or the like as shown in FIG. 5A. After detecting the content (or content filter) selected by the user, the controller unit 104 computes the semantic signature of the content filter. The controller unit 104 computes the representation of topics within the content filter. The computed semantic signature of the content filter is stored in the storage unit 108.

The controller unit 104 receives the content to be displayed on the display unit 106 of the electronic device 100. After receiving the content, the controller unit 104 computes the semantic signature of the portion of the content to be displayed on the display unit 106. The semantic signature computation process considers the whole text to account to figure out a list of latent topics available within the complete content, the latent signature (i.e., probabilistic word vector) for the specific content and category information which is provided based on a supervised model that may be pre-existing on the electronic device 100 and preloaded by OEM.

The controller unit 104 determines the degree of similarity between the semantic signature of the portion of the content and the stored semantic signature for purpose of detecting the objectionable content. The controller unit 104 detects the at least one portion of the content as the objectionable content based on the degree of similarity. After detecting the at least one portion of the content as the objectionable content, the controller unit 104 masks the at least one portion of the content (i.e., corresponding areas within the rendered web page) displayed on the electronic device 100 as shown in FIG. 5B.

The content filter may be defined by the third party. Further, the content filter can be defined for a single language or a cross language, the semantically defined sections can be automatically cross language mapped as shown in FIG. 5C. In case of semantically mapped sections, cross-language is performed based on supervised topic distributions within other language content. For word(s) or word combinations, translation or transliteration techniques which are known in art are used.

Figure 6:
FIG. 6 illustrates an example for masking one or more links within content displayed on an electronic device according to an embodiment of the present disclosure.

FIG. 6 illustrates an example for masking one or more links within the content displayed on the electronic device according to an embodiment of the present disclosure.

Referring to FIG. 6, initially, consider a scenario where the user loads the web page. Once the web page is loaded, the micro-crawler 212 that resides within the client browser crawls through all the links and fetches the content behind each link. The fetched content behind each link is passed to the filter application manager 204. After receiving the fetched content, the filter application manager 204 transfers the received content (i.e., fetched content) to the semantic extraction engine 206 to determine whether the link needs to be masked, highlighted, or not.

After receiving the content behind each link, the semantic extraction engine 206 computes the semantic signature of the at least one portion of the content behind each link. The semantic extraction engine 206 determines the degree of similarity between the semantic signature of the at least one portion of the content behind each link and the stored semantic signature for purpose of detecting the objectionable content. Further, the semantic extraction engine 206 detects the at least one portion of the content behind each link as the objectionable content based on the degree of similarity. After detecting the at least one portion of the content behind each link as the objectionable content, the links to the objectionable content are masked by the micro-crawler 212 as shown in FIG. 6.

Figure 7A:
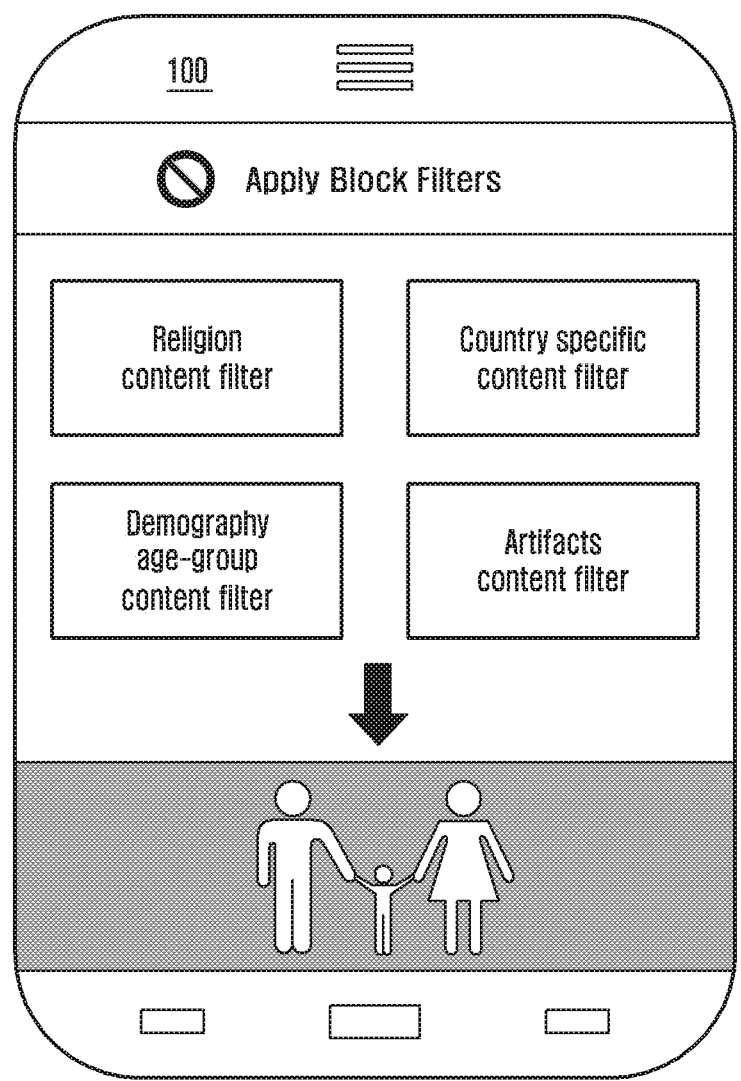
FIGS. 7A and 7B illustrate an example for using an external content filter for masking content displayed on an electronic device according to an embodiment of the present disclosure.
Figure 7B:
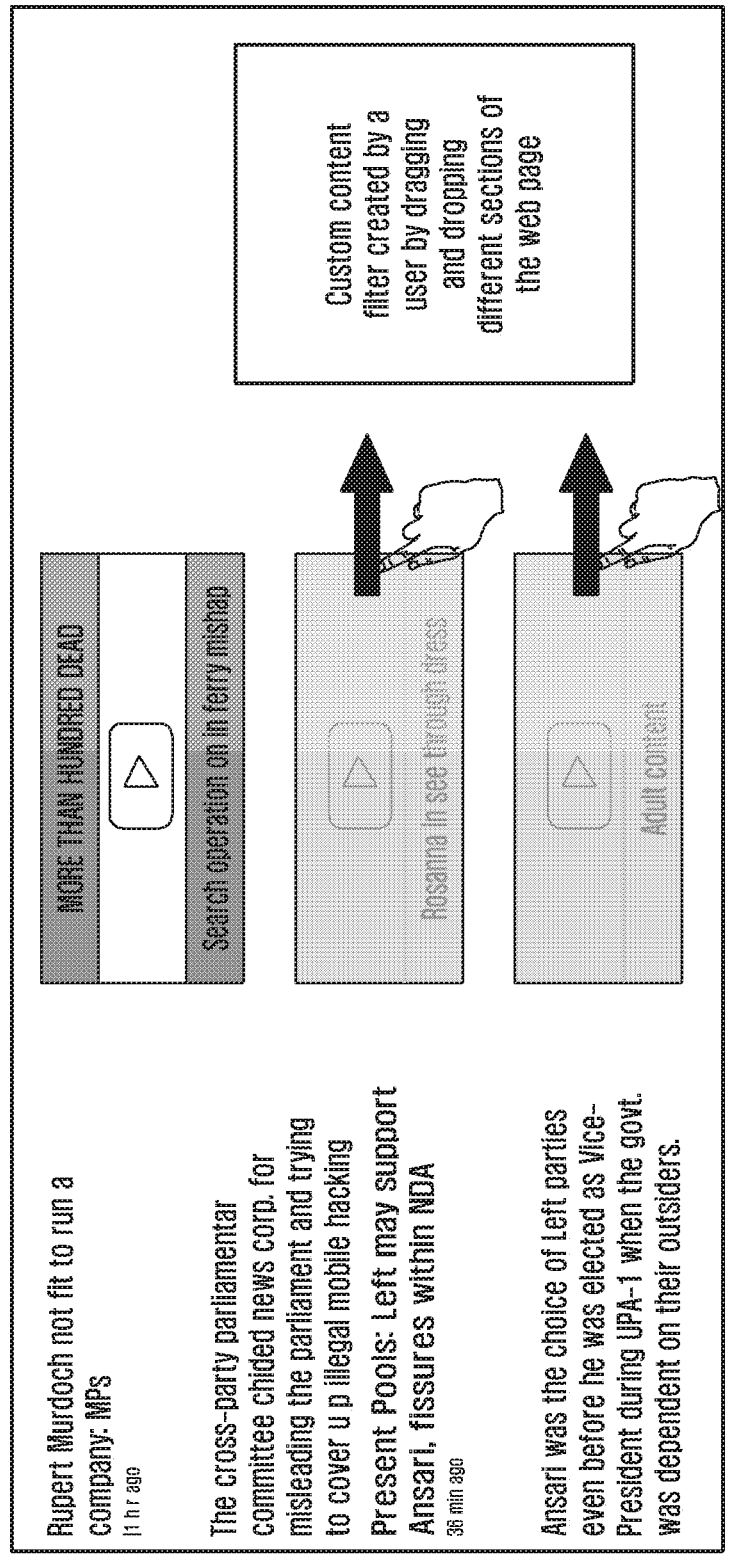

FIGS. 7A and 7B illustrate an example for using external content filter for masking the content displayed on the electronic device 100 according to an embodiment of the present disclosure.

Referring to FIGS. 7A and 7B, the external content filters are generated based on the semantic signatures from the objectionable content. The content filters are applicable for all or selected content through the user selected based on a browser UI. The external content filter can be applied to the family members or associated groups of the user as shown in FIG. 7A, thus provisioning the user with a capability to generate and distribute the content filters to other members. The UX may be provided to the user for generating the content filter through the drag and drop action of the selected content onto a defined filter. In another embodiment, the content filters are discoverable from a filter tab on the browser, the UI from the browser, the UI platform, or from an external service.

The content filter represents a mathematical semantic representation. The content filters can be about the religion, the country specific, the demography age-group, artifacts (guns, wars, or the like). The users can create custom content filters as shown in FIG. 7B. The user creates the custom filter by defining the content filter and dragging and dropping sections within the web page to the filter as shown in FIG.

7B. The semantics for the filter are created and are visible in a filter tab or sought from the service.

FIG. 8 illustrates another example for indicating an extent of masking to the user according to an embodiment of the present disclosure.

Referring to FIG. 8, the word, the section, or the phrase can be modified to indicate an extent of masking or in an appropriate way presentable to the user (i.e., not restricted to masking of the content). For example, the word "STABBED" may be indicated in the appropriate way presentable to the user as shown below:

STABBED (Masked Version)
STABBED (Shrunken Version)
HARMED (Alternate Word)

Further, as shown in FIG. 8, the user performs a long press gestures on the masked section. After detecting the long press gestures, the controller unit 104 displays a message as to why the section is masked. The user is displayed with the message "Cannot read this because it is not appropriate for 5 years old" as a metadata to filter during the time the content filter is made. The message is displayed when the end user needs to know why the content is masked by long pressing on the content filter applied (over masked/highlight section).

FIG. 9 illustrates an example for providing positive read experience according to an embodiment of the present disclosure.

Referring to FIG. 9, the characteristic of the content filter can be set during creation of the content filter. The example characteristics are, for example, block (Can be default), Highlight, Warning, Send message, Positive highlight, or the like.

An example of positive highlight for a particular section is shown in FIG. 9. Here, the "Positive highlight" content filter is applied. In another embodiment, "Send Message" mode characteristic can be invoked to send the message to originator (or designated person) when a particular type of content is accessed.

Figure 10:
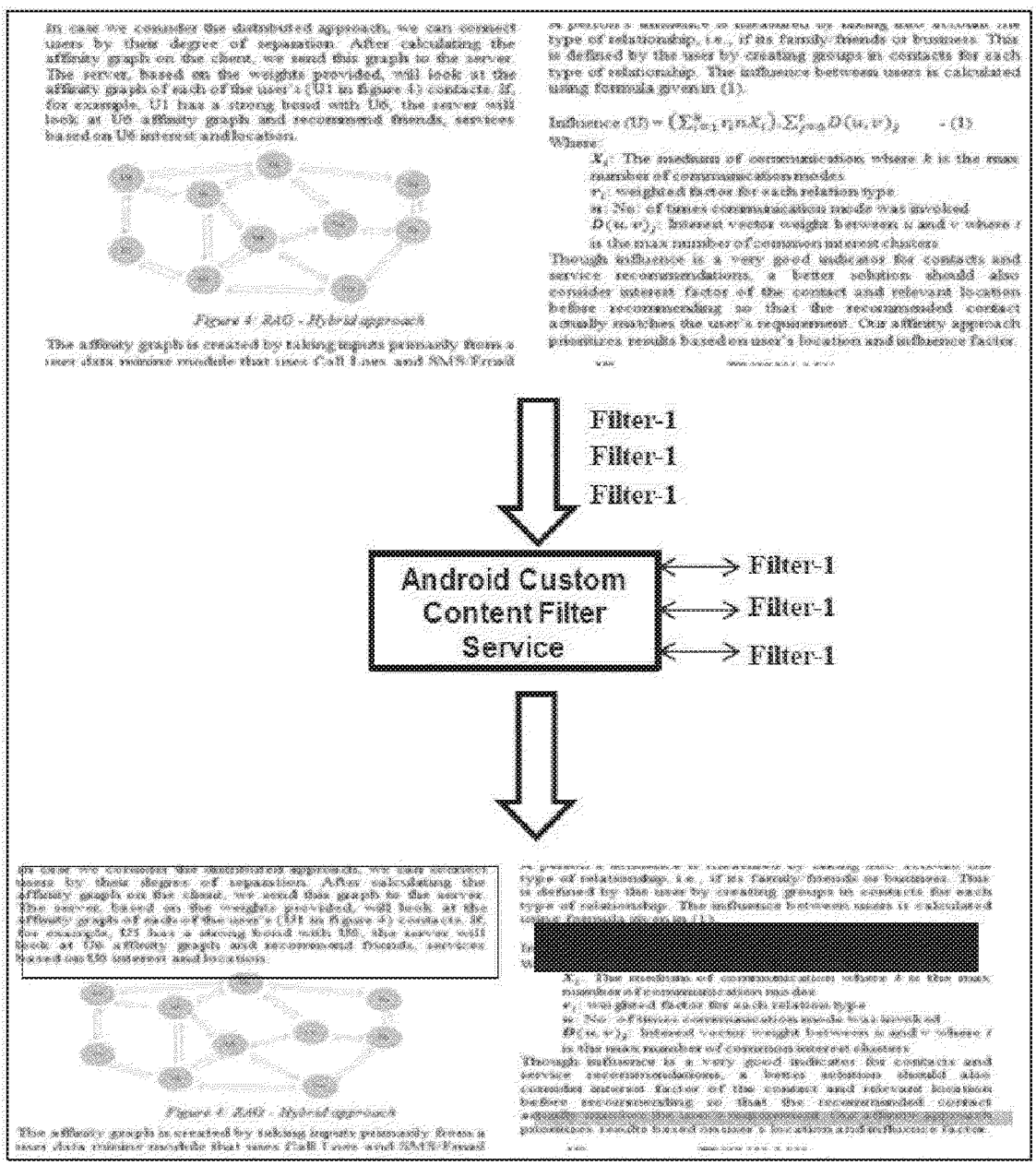
FIG. 10 illustrates an example content filter for documents according to an embodiment of the present disclosure.

FIG. 10 illustrates an example content filter for documents according to an embodiment of the present disclosure.

Referring to FIG. 10, the content filter framework can be provided as an android (platform) service. Any application can call its interfaces to create an apply filters for the content. The document can be sent with a set of applied content filters (applicable for particular group of people) as shown in FIG. 10.

Figure 11:
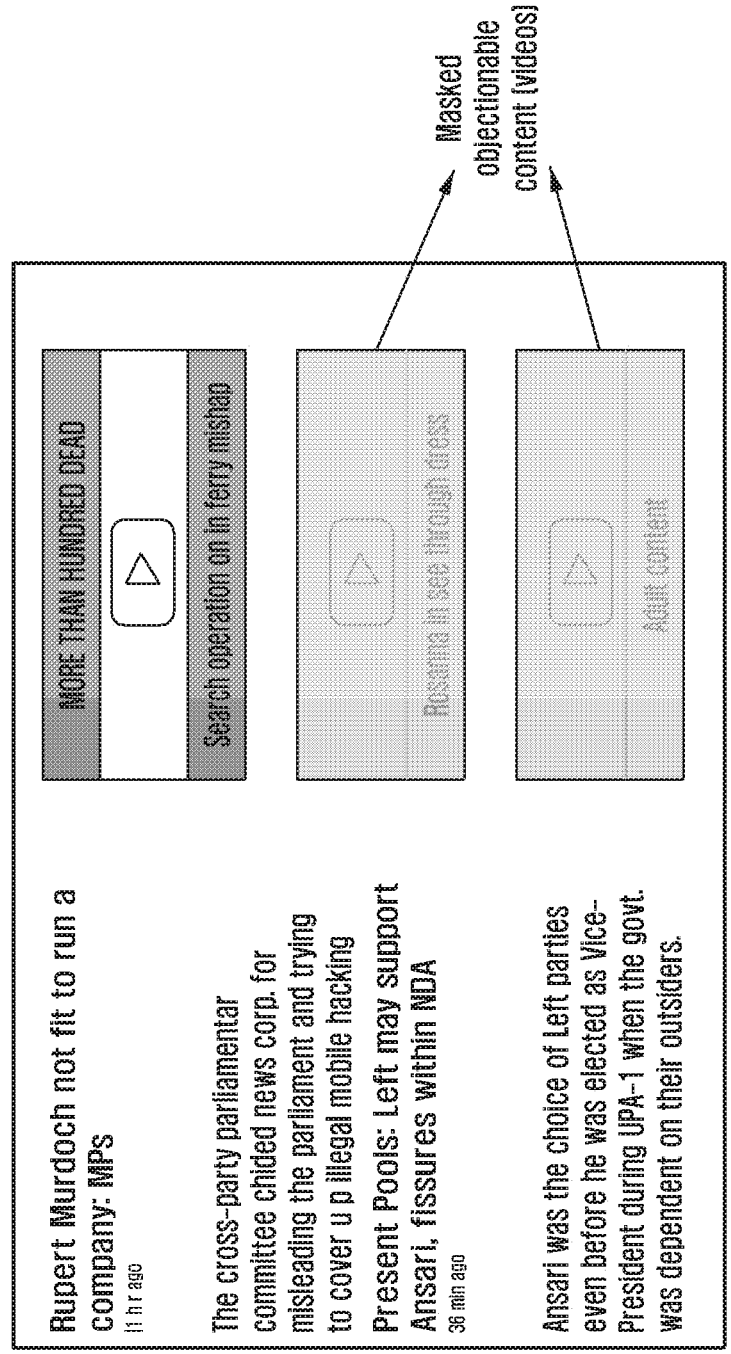
FIG. 11 illustrates an example for masking the images and videos to be displayed on an electronic device according to an embodiment of the present disclosure.

FIG. 11 illustrates an example for masking the images and videos to be displayed on the electronic device according to an embodiment of the present disclosure.

Referring to FIG. 11, the objectionable images and videos within the web page can be masked. Unlike the systems and methods of the related art, the at least one portion of the sections, words or word combinations, and objectionable phrases can be masked based on the semantic signatures.

Figure 12:
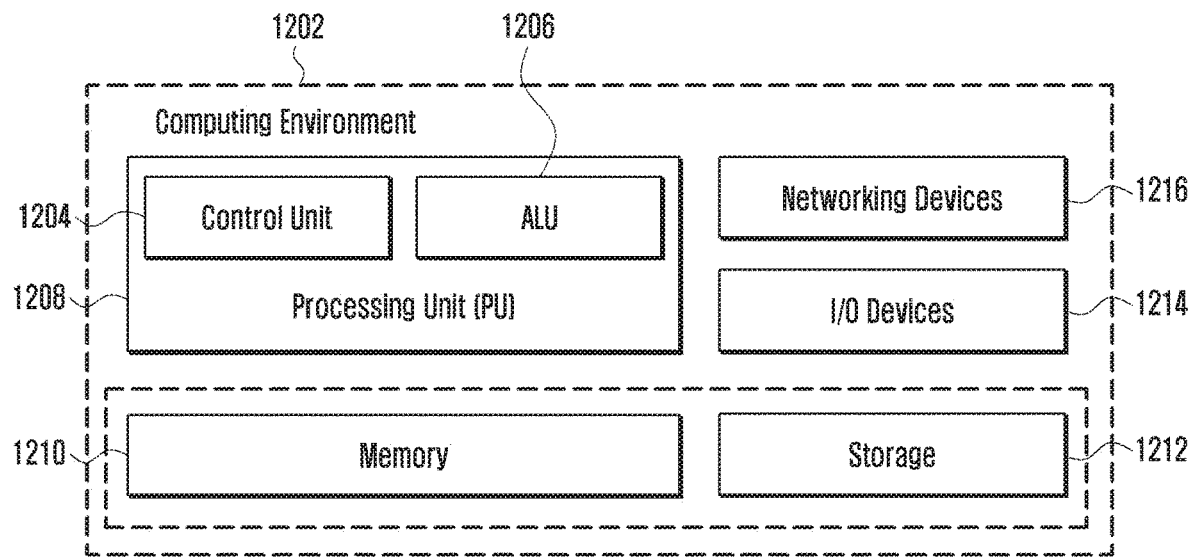
FIG. 12 illustrates a computing environment implementing a method and system for masking content to be displayed on an electronic device according to various embodiments of the present disclosure.

FIG. 12 illustrates a computing environment implementing the method and system for masking content to be displayed on the electronic device 100 according to various embodiments of the present disclosure.

Referring to FIG. 12, the computing environment 1202 comprises at least one processing unit 1208 that is equipped with a control unit 1204 and an arithmetic logic unit (ALU) 1206, a memory 1210, a storage unit 1212, plurality of networking devices 1216 and a plurality of input output (I/O) devices 1214. The processing unit 1208 is responsible for processing the instructions of the scheme. The processing unit 1208 receives commands from the control unit in order to perform its processing. Further, any logical and arithmetic operations involved in the execution of the instructions are computed with the help of the ALU 1206.

The overall computing environment 1202 can be composed of multiple homogeneous or heterogeneous cores, multiple central processing units (CPUs) of different kinds, special media, and other accelerators. The processing unit 1208 is responsible for processing the instructions of the scheme. Further, the plurality of processing units 1208 may be located on a single chip or over multiple chips.

The scheme comprising of instructions and codes required for the implementation are stored in either the memory unit 1210 or the storage 1212 or both. At the time of execution, the instructions may be fetched from the corresponding memory 1210 or storage 1212, and executed by the processing unit 1208.

In case of any hardware implementations various networking devices 1216 or external I/O devices 1214 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 through 12 include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for providing content of an electronic device, the method comprising:
    obtaining, by at least one processor in the electronic device, the content to be displayed on the electronic device based on a user input;
    determining, by the at least one processor, a degree of similarity between a semantic signature of at least one portion of the content and a semantic signature of a content filter; and
    masking or highlighting, by the at least one processor, the at least one portion of the content displayed on the electronic device based on the degree of similarity,
    wherein a type of masking or highlighting is determined based on the degree of similarity.

2. The method of claim 1, the method further comprising:
    receiving the content filter from an external electronic device.

3. The method of claim 1, wherein the type of the masking or highlighting comprises at least one of blocking the at least one portion of the content completely, blocking the at least one portion of the content partially, blocking the at least one portion of the content transparently, changing font style or font size of the at least one portion of the content, changing the at least one portion of the content to an alternative content, or highlighting the at least one portion of the content.

4. The method of claim 1, further comprising:
    detecting a user input on the masked or highlighted content; and
    displaying a message indicating why the at least one portion of the content is masked or highlighted.

5. The method of claim 1, further comprising:
   detecting a user input for unmasking the at least one portion of the content;
   sending a unmask request to an external device of another user; and
   unmasking the at least one portion of the content in response to permission for unmasking at the external device by the another user.

6. The method of claim 1, wherein the content filter is created based on at least one of a specific word, a specific age, a specific country, a specific artifact, a specific event, a specific religion, or a specific culture determined by a user.

7. The method of claim 1, wherein the at least one portion of the content comprises at least one of text, an image, a video, a uniform resource locator (URL), a uniform resource identifier (URI), or a content linked to by the URL.

8. The method of claim 7, wherein the content behind the URL is determined by searching semantic content linked to by the URL by a web crawler.

9. The method of claim 1, wherein the content filter is one of generated within the electronic device and received from another electronic device.

10. The method of claim 9, wherein the content filter is generated by computing a semantic signature of content selected by a user of the electronic device.

11. An electronic comprising:
    a display configured to display contents; and
    at least one processor configured to:
       obtain the content to be displayed on the electronic device based on a user input,
       determine a degree of similarity between a semantic signature of at least one portion of the content and a semantic signature of a content filter, and
       mask or highlight the at least one portion of the content displayed on the electronic device based on the degree of similarity,
    wherein the at least one processor is further configured to determine a type of masking or highlighting based on the degree of similarity.

12. The electronic device of claim 11, wherein the at least one processor is further configured to receive the content filter from an external device.

13. The electronic device of claim 11, wherein the type of the masking or highlighting comprises at least one of blocking the at least one portion of the content completely, blocking the at least one portion of the content partially, blocking the at least one portion of the content transparently, changing font style or font size of the at least one portion of the content, changing the at least one portion of the content to an alternative content, or highlighting the at least one portion of the content.

14. The electronic device of claim 11, wherein the at least one processor is further configured to:
    detect a user input on the masked or highlighted content, and
    display a message indicating why the at least one portion of the content is masked or highlighted.

15. The electronic device of claim 11, wherein the at least one processor is further configured to:
    detect a user input for unmasking the at least one portion of the content,
    send a unmask request to an external device of another user, and
    unmask the at least one portion of the content in response to permission for unmasking at the external device by the another user.

16. The electronic device of claim 11, wherein the at least one processor is further configured to create the content filter based on at least one of a specific word, a specific age, a specific country, a specific artifact, a specific event, a specific religion, or a specific culture determined by a user.

17. The electronic device of claim 11, wherein the at least one portion of the content is at least one of a text, an image, a video, a uniform resource locator (URL), a uniform resource identifier (URI), a content linked to by the URL.

18. The electronic device of claim 17, wherein the content behind the URL is determined by searching semantic content linked to by the URL by a web crawler.

19. The electronic device of claim 11, wherein the content filter is one of generated within the electronic device and received from another electronic device.

20. The electronic device of claim 19, wherein the content filter is generated by computing a semantic signature of content selected by a user of the electronic device.

* * * * *